Patented Nov. 6, 1934

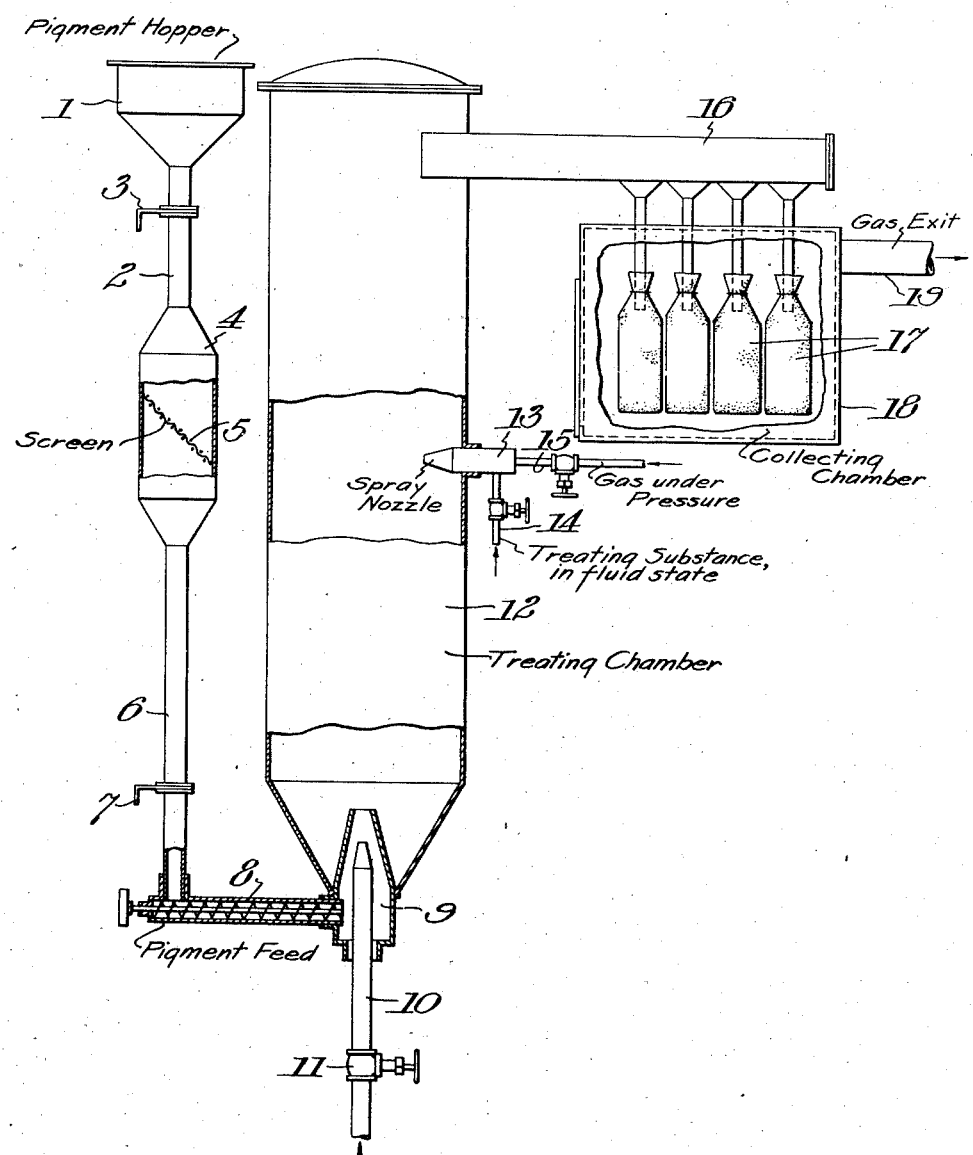

1,979,380

UNITED STATES PATENT OFFICE 1,979,380

PIGMENT AND METHOD OF MANUFACTURE

Henry A. Gardner, Washington, D. C.

Application March 31, 1931, Serial No. 526,773

1 Claim. (Cl. 134—58)

The present invention relates to the production of pigment products characterized by the fact that the surfaces of the individual pigment particles are coated with relatively small amounts of substances which modify certain of the physical characteristics of the pigments so coated.

In my co-pending applications Serial No. 509,263, filed January 16, 1931, and Serial No. 510,585, filed January 22, 1931, now Patent No. 1,894,168, there has been described the coating of pigments by adsorption of, or by interaction with, various fatty substances, pigments which are basic in nature being in general the more likely to evidence interaction with the coating substance. The resulting pigments possess the property of being readily wetted by organic substances such as linseed oil or rubber, while having increased water-proofness over that of the uncoated pigments.

The aforesaid coating operation may be effected either in the presence or in the absence of a liquid medium. A feature of the present invention is an especially satisfactory method of coating pigment particles with a fatty substance without intervention of a liquid medium. This method, in essence, consists in intimately associating a mist of the treating substance with a suspension of the pigment particles in a gaseous medium such as air. The said "mist" is a current of highly subdivided (practically colloidal) particles of the treating substance, such as is produced by forcing a melt, or a concentrated solution, of the substance (in the case of a material which normally is solid), or a normally fluid substance as such; at a pressure of about 40 pounds per square inch through an extremely small orifice of a spray gun, or equivalent atomizing means, whereby to effect a substantially colloidal subdivision of the treating substance. In the cases of certain sublimable solids, the sublimation vapors thereof are operable.

My preferred method is as follows: A quantity of dry pigment, such for instance as zinc oxide, carbon black, titanium pigment, or other pigment adapted for use in the preparation of paints or rubber compositions, is slowly fed downwardly from a hopper through a screen of suitable mesh size, whereupon the stream of pigment is contacted with a current of air, or equivalent carrying gas, of buoying pressure, which transports the pigment particles as a cloud upwardly through a tall conduit or tall chamber having a cross-sectional area which is relatively small. Intermediate the bottom and top of this chamber is on opening through which projects the nozzle of a spray gun through which nozzle is projected a mist of the treating substance. This mist meets the cloud of pigment and coats each particle of the latter while in suspension in the carrying gas with an amount of the treating substance. The cloud of so-coated pigment is then passed into a collecting chamber, such for instance as a box of metal screening or mesh fabric through the openings of which the carrying gas may escape but within which the pigment particles are retained.

The invention will be further explained by reference to the accompanying drawing, which is a diagrammatic showing, with parts in section, of one form of apparatus adapted for use in the carrying out of this process.

In the drawing, 1 represents a hopper from which pigment particles are discharged through conduit 2 past the valve 3 and into the screening compartment 4. 5 conventionally represents a suitable screen positioned within compartment 4 and through which pigment particles delivered by conduit 2 are passed. Screened pigment drops from the bottom of compartment 4 through conduit 6 and past the valve 7 into the intake end of a conventional feed device 8 which terminates in aspirator nozzle 9. The pipe 10, provided with valve 11, supplies carrying gas, under pressure, from a source thereof (not shown) to the aspirator nozzle 9. The latter is axially positioned at the lower end of a vertically disposed treating chamber 12 of relatively narrow cross section for effective height. Intermediate the ends of chamber 12 and extending into the interior of the latter through a wall thereof is the atomizing spray nozzle 13 provided with valved conduits 14 and 15 for the supply thereto of fluid treating substance and atomizing gas under pressure, respectively, from sources thereof (not shown). 16 represents an exit conduit for aeroform fluids from the top of chamber 12, which exit conduit communicates with the bag filters 17 in collecting chamber 18. 19 is a gas exit pipe for the passage of carrying gas from chamber 18 to the atmosphere.

In operation, pigment is passed from hopper 1 through conduit 2 into and through the screening compartment and thence by means of conduit 6 to the feed device 8, which latter moves the screened pigment into the aspirating nozzle 9 from whence it is raised, by the force of the carrying gas admitted through said nozzle, into and upwardly through the treating chamber 12. Onto the so-produced cloud of aeroform fluid, consisting of pigment particles suspended in and upwardly carried by the carrying gas, is atomized the fluid treating substance through spray nozzle 13, which substantially colloidally subdivided treating substance commingles with the suspended pigment particles and coats over the latter. The so-coated particles are carried upwardly through the chamber 12 and thence into the collecting chamber 18 in which they are separated from the carrying gas which latter escapes from the collecting chamber through the gas exit pipe 19.

Among the coating materials that I have employed in carrying out the process of the present invention are metallic soaps such as the metallic salts of stearic acid, oils such as linseed oil and particularly a linseed oil having an acid value of about 15, fatty acids, wax-like substances, resinous materials, phthalic anhydride and other sublimable organic acids, China wood oil, or the beta-elaeostearin-containing product obtained by subjecting China wood oil to irradiation (actinic light) treatment. While with some of these substances it may be necessary to use solvents in order to expedite the aforesaid subdivision, I prefer not to have present any volatile matter other than the treating material itself.

The resulting products are, in general, characterized, as distinguished from the uncoated pigments, by increased water-repellance, a materially reduced oil absorption ratio, and improved lubricating properties. This latter characteristic is evidenced in the compounding of the coated pigment with rubber, in that the said pigment more readily mixes, or "compounds", with the rubber than does the uncoated pigment.

I have found that in treating a pigment for use as a rubber compounding ingredient, I can replace, either in whole or in part, the fatty ingredients named above and in the aforesaid applications Serial No. 509,263, filed January 16, 1931, and Serial No. 510,585, filed January 22, 1931, now Patent No. 1,894,168 by ingredients which are known as accelerators of the vulcanization of rubber. By this means I coat over the particles of zinc oxide or other rubber pigment with a material which either becomes adsorbed or else reacts with the base pigment, and which in some instances at the same time may serve to increase the dispersion or melting of the pigment when compounded with rubber.

There is a very wide range of rubber accelerators which I may employ in this process, such as mercapto-benzol-thiozole, heptene base liquids, haptaldehyde aniline products, ethylidine aniline compounds, tetra-methyl-thiuran-monosulfide, condensation products of dimethylamine, and carbon disulphide, aldehydeamine accelerators, diphenyl guanidine, etc. I can, of course, employ any type of liquid accelerator or even such solid accelerators as may be melted.

I may also employ resinous materials, and especially desirable for this purpose is the resin produced by the condensation of aldehyde and sulfonamids of toluol, benzene, or xylene. Some resins of this character are described in Gardner Patent No. 1,564,664. These arylsulfonamid-aldehyde resins serve the double functions of being accelerators of the vulcanization of rubber and of increasing the "wetting" properties of the pigments carrying them into the rubber mix.

While the amount of waterproofing substance or accelerator which I add to the pigment may range any where from one-tenth of one percent or even less up to as high as five percent, I customarily employ only one percent thereof, since this amount is usually sufficient to give the desired wetting properties to the pigment, or the desired acceleration during vulcanization.

In further illustration of the process of the present invention the following additional examples are given:

Into a flowing stream of air under pressure suspending 100 pounds of zinc oxide is blown a colloidal mist of molten stearic acid in such proportion with respect to the pigment content of the stream as to yield a coating on the zinc oxide particles amounting to about 1% of the stearic acid: substantially simultaneously with the injection of the molten stearic acid there is blown into the stream a colloidal mist of heptene base liquid in amount with respect to the content of the pigment in the stream sufficient to yield in the resulting coating a content of heptene base liquid of about 0.4% of the product. The resulting pigment product consists of zinc oxide particles carrying a sheath or coating composed of stearic acid and heptene base liquid.

In place of stearic acid I may use molten rosin. In such case the rosin is dispersed in the heptene base liquid and the mixture is atomized as a colloidal mist, said mist being united with the aforesaid stream of suspending gas carrying slight particles of zinc oxide. The rosin-heptene base liquid mixture contains the ingredients in substantially equal parts by weight, and the mixture in atomized condition is added to the stream of pigment particles in such proportion as to yield a coating amounting to about 2% by weight of the pigment product, i. e., about 1% of each of the ingredients.

In another embodiment of the invention, 100 grams of China wood oil treated with a trace of a catalyst such as iodine in an amount equivalent to about 0.1% of the oil is exposed to actinic light, such as the light yielded by a mercury arc tube, for one hour, and while the resulting product is warm and still fluid it is blown as a colloidal mist into a stream of pigment particles, e. g., zinc oxide particles suspended in a current of air. The China wood oil product, containing beta-elaeostearin, is atomized in such amount as to yield a coating of 2% by weight of the pigment product.

I claim:

Process which comprises suspending solid pigment particles in a flowing stream of a suspending gas, upwardly moving the stream of gas and the pigment particles suspended therein, dispersing a relatively small amount of a vapor of an organic coating material not substantially reactive with the pigment in the said upwardly moving stream, thereby coating the individual particles of pigment with films of the coating material in amount from 0.1% to 5.0% by weight of the coating material based upon the weight of the pigment, and thereafter separating the resulting pigment product from the suspending gas.

HENRY A. GARDNER.